United States Patent
Tong et al.

(10) Patent No.: US 10,984,534 B2
(45) Date of Patent: Apr. 20, 2021

(54) IDENTIFICATION OF ATTENTION REGION FOR ENHANCEMENT OF SENSOR-BASED DETECTION IN A VEHICLE

(71) Applicant: GM Global Technology Operations LLC, Detroit, MI (US)

(72) Inventors: Wei Tong, Troy, MI (US); Shuqing Zeng, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 84 days.

(21) Appl. No.: 16/367,579

(22) Filed: Mar. 28, 2019

(65) Prior Publication Data

US 2020/0311942 A1    Oct. 1, 2020

(51) Int. Cl.
   *G06T 7/00* (2017.01)
   *G06T 7/11* (2017.01)
   *B60R 11/04* (2006.01)
   *G06T 7/174* (2017.01)
   *G06K 9/00* (2006.01)

(52) U.S. Cl.
   CPC ............ *G06T 7/11* (2017.01); *B60R 11/04* (2013.01); *G06K 9/00805* (2013.01); *G06T 7/174* (2017.01); *B60R 2300/8033* (2013.01); *B60R 2300/8093* (2013.01); *G06T 2207/30261* (2013.01)

(58) Field of Classification Search
CPC . G06T 7/11; G06T 7/174; G06T 2207/30261; B60R 11/04; B60R 2300/8033; B60R 23/8093; G06K 9/00805
See application file for complete search history.

(56) References Cited

U.S. PATENT DOCUMENTS

| | | | |
|---|---|---|---|
| 2006/0072833 A1* | 4/2006 | Ma | G06K 9/3241 382/232 |
| 2013/0312042 A1* | 11/2013 | Shaw | H04N 21/45455 725/62 |
| 2019/0179023 A1* | 6/2019 | England | B60W 30/18145 |
| 2020/0184218 A1* | 6/2020 | Cheng | G02B 27/017 |
| 2020/0186875 A1* | 6/2020 | Han | G06Q 30/0241 |

* cited by examiner

*Primary Examiner* — Khai M Nguyen
(74) *Attorney, Agent, or Firm* — Cantor Colburn LLP

(57) ABSTRACT

Systems and methods to identify an attention region in sensor-based detection involve obtaining a detection result that indicates one or more detection areas where one or more objects of interest are detected. The detection result is based on using a first detection algorithm. The method includes obtaining a reference detection result that indicates one or more reference detection areas where one or more objects of interest are detected. The reference detection result is based on using a second detection algorithm. The method also includes identifying the attention region as one of the one or more reference detection areas without a corresponding one or more detection areas. The first detection algorithm is used to perform detection in the attention region.

20 Claims, 3 Drawing Sheets

IDENTIFICATION OF ATTENTION REGION FOR ENHANCEMENT OF SENSOR-BASED DETECTION IN A VEHICLE

INTRODUCTION

The subject disclosure relates to the identification of an attention region for enhancement of sensor-based detection in a vehicle.

Vehicles (e.g., automobiles, trucks, construction equipment, farm equipment, automated factory equipment) are increasingly equipped with sensors that provide information about the vehicle and objects in the vicinity of the vehicle. The information may be used to augment or automate aspects of vehicle operation (e.g., collision avoidance, adaptive cruise control, autonomous driving). Sensors (e.g., camera, radio detection and ranging (radar) system, light detection and ranging (lidar) system) obtain data that may then be processed using various algorithms to perform the object detection. While high resolution sensors are increasingly available, the onboard processing capability to process all the available data in real time may not be available. Further, not all the data (e.g., an area of an image showing the sky versus an area of the image showing a road surface) may be equally important to the task of automated or semi-automated driving. Accordingly, it is desirable to provide the identification of an attention region for enhancement of sensor-based detection in a vehicle.

SUMMARY

In one exemplary embodiment, a method of identifying an attention region in sensor-based detection includes obtaining a detection result that indicates one or more detection areas where one or more objects of interest are detected. The detection result is based on using a first detection algorithm. The method also includes obtaining a reference detection result that indicates one or more reference detection areas where one or more objects of interest are detected. The reference detection result is based on using a second detection algorithm. The attention region is identified as one of the one or more reference detection areas without a corresponding one or more detection areas. The first detection algorithm is used to perform detection in the attention region.

In addition to one or more of the features described herein, the method also includes obtaining data from a first sensor at a first resolution.

In addition to one or more of the features described herein, the method also includes reducing a resolution of the data to a second resolution.

In addition to one or more of the features described herein, the obtaining the detection result includes using the first detection algorithm on the data at the second resolution.

In addition to one or more of the features described herein, the obtaining the reference detection result includes using the second detection algorithm on the data at the second resolution.

In addition to one or more of the features described herein, the obtaining the reference detection result includes using the second detection algorithm on other data from another sensor.

In addition to one or more of the features described herein, the obtaining the detection result and the obtaining the reference detection result includes the first sensor and the another sensor having a common field of view.

In addition to one or more of the features described herein, the obtaining the data from the first sensor includes obtaining the data from a camera.

In addition to one or more of the features described herein, the obtaining the detection result includes obtaining one or more bounding boxes that surround a detected object.

In addition to one or more of the features described herein, the obtaining the reference detection result includes obtaining one or more classification areas resulting from segmentation, each classification area indicating an object classification in an area of a field of view of the camera.

In another exemplary embodiment, a system to identify an attention region in sensor-based detection includes a sensor to obtain data. The system also includes a processor to obtain a detection result that indicates one or more detection areas where one or more objects of interest are detected from the data. The detection result is based on using a first detection algorithm. The processor also obtains a reference detection result that indicates one or more reference detection areas where one or more objects of interest are detected. The reference detection result is based on using a second detection algorithm. The processor additionally identifies the attention region as one of the one or more reference detection areas without a corresponding one or more detection areas, and uses the first detection algorithm to perform detection in the attention region.

In addition to one or more of the features described herein, the data from the sensor is at a first resolution.

In addition to one or more of the features described herein, the processor is further configured to reduce a resolution of the data to a second resolution.

In addition to one or more of the features described herein, the processor obtains the detection result using the first detection algorithm on the data at the second resolution.

In addition to one or more of the features described herein, the processor obtains the reference detection result using the second detection algorithm on the data at the second resolution.

In addition to one or more of the features described herein, the processor obtains the reference detection result using the second detection algorithm on other data from another sensor.

In addition to one or more of the features described herein, the sensor and the other sensor have a common field of view.

In addition to one or more of the features described herein, the sensor and the other sensor are in a vehicle.

In addition to one or more of the features described herein, the first sensor is a camera.

In addition to one or more of the features described herein, the detection result includes one or more bounding boxes that surround a detected object, and the reference detection result includes one or more classification areas resulting from segmentation, each classification area indicating an object classification in an area of a field of view of the camera.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
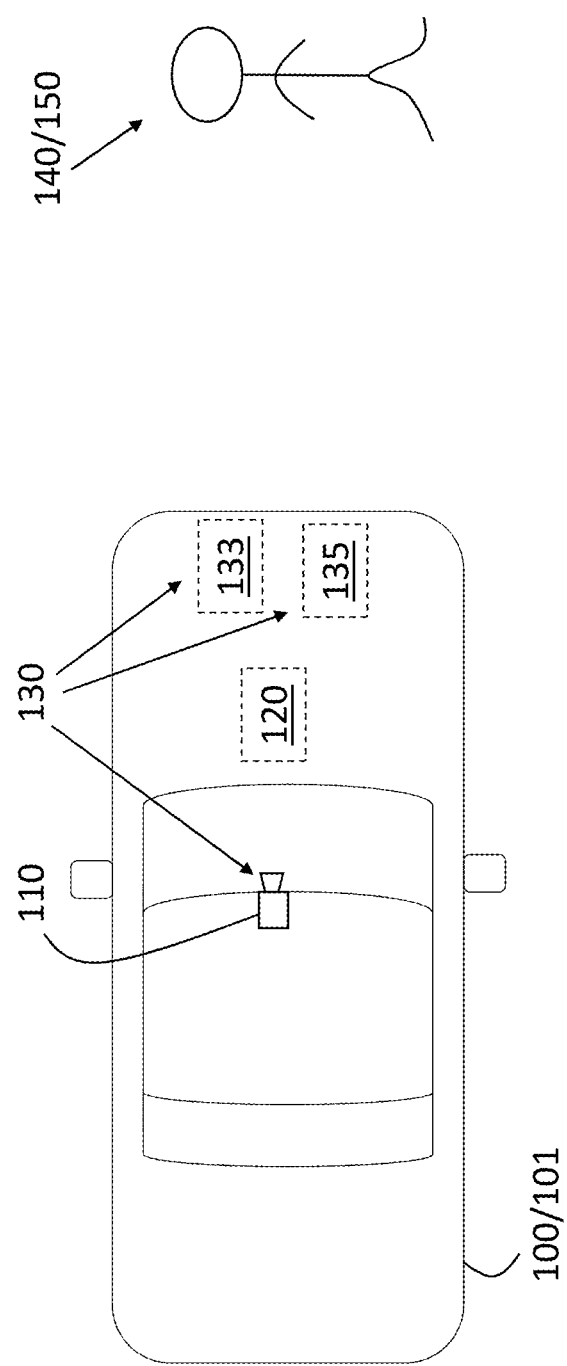
FIG. 1 is a block diagram of a vehicle that includes identification of an attention region for enhancement of sensor-based detection.

The following description is merely exemplary in nature and is not intended to limit the present disclosure, its application or uses. It should be understood that throughout the drawings, corresponding reference numerals indicate like or corresponding parts and features.

As previously noted, data obtained with sensors may be processed to obtain information such as information about objects around a vehicle. When high resolution sensor data is processed naively (i.e., without any additional knowledge), the resulting detection may not only be inaccurate but also consumes resources without yielding useful results. Embodiments of the systems and methods detailed herein relate to the identification of an attention region for detection enhancement in a vehicle. Attention region is a term used to refer to a region that warrants further analysis. Specifically, low resolution data is used to identify the attention region, which is then analyzed further using the high resolution data. In this way, resources are expended for high resolution processing only in regions that are known to be of interest.

In accordance with an exemplary embodiment, FIG. 1 is a block diagram of a vehicle 100 that includes identification of an attention region for enhancement of sensor-based detection. The exemplary vehicle 100 in FIG. 1 is an automobile 101. The vehicle 100 includes a camera 110 and one or more other sensors 130, like a radar system 133 or lidar system 135. A controller 120 may communicate with the camera 110 and other sensors 130 to determine the attention region. While one exemplary arrangement of the camera 110, other sensors 130, and controller 120 is shown in FIG. 1, those components may be located elsewhere in or on the vehicle 100. In addition, additional cameras 110, controllers 120, or other sensors 130 may also be included.

The controller 120 may also implement or communicate with other controllers that implement autonomous or semi-autonomous vehicle functions (e.g., autonomous braking, collision avoidance, adaptive cruise control, autonomous driving) based on information obtained by the camera 110 or other sensors 130. The information may include the relative position of objects 140 such as the pedestrian 150 shown in FIG. 1. The controller 120 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
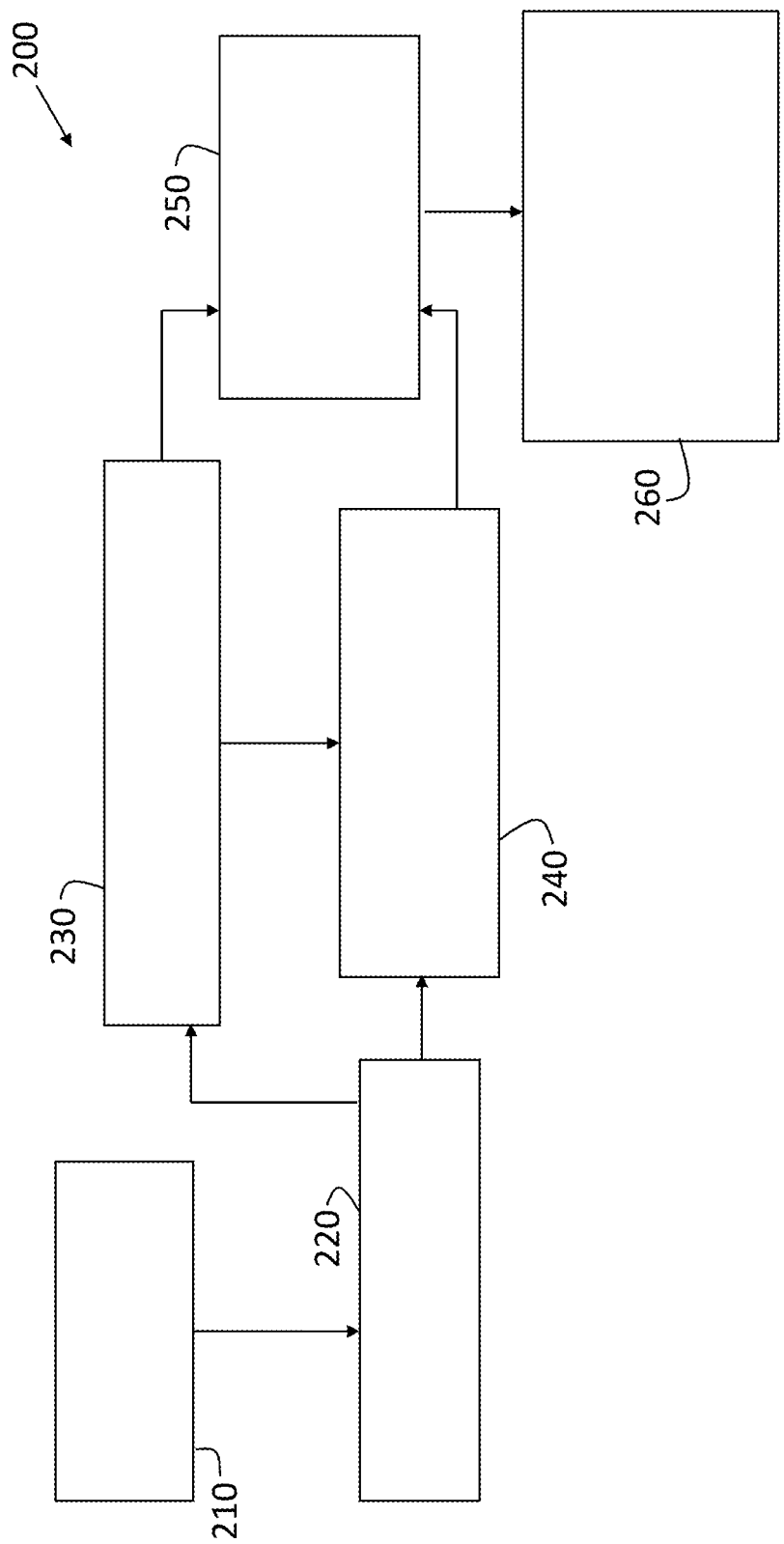
FIG. 2 is a process flow of a method of identifying an attention region for enhancement of sensor-based detection according to one or more embodiments.

FIG. 2 is a process flow 200 of a method of identifying an attention region for enhancement of sensor-based detection according to one or more embodiments. The method may be performed by controller 120 in vehicle 100 that obtains data from the one or more sensors 130, according to an exemplary embodiment. For explanatory purposes, the camera 110 is discussed as the sensor 130 whose detection is enhanced by identifying the attention region according to one or more embodiments. At block 210, obtaining data from a sensor 130 includes obtaining a high-resolution image (e.g., 1280 pixels by 800 pixels) from the camera 110, for example. At block 220, obtaining reduced-resolution data from the sensor 130 refers to generating reduced resolution data from the original data (at block 210). Thus, a low-resolution image (e.g., 320 pixels by 200 pixels) may be obtained (at block 220) from the initial high-resolution image (at block 210) for the example involving the camera 110.

At block 230, obtaining a reference detection result may be performed in different ways. In the case of the low-resolution image (at block 220), the reference detection result may be a pixel-level classification referred to as segmentation. That is, the low-resolution image may be partitioned (i.e., segmented) and each segment (i.e., pixel region) may be classified based on the values of the pixels in the segment. The classification corresponds with objects of interest in the image, and the segmentation results in a set of pixel regions $S=\{s_i\}$, $i=1, \ldots, m$ and m is the total number of pixel regions. Thus, each $s_i$ provides the classification associated with a pixel region. According to an alternate embodiment, the reference detection result may be a detection result obtained, at block 230, using a different sensor 130 (e.g., radar system 133, lidar system 135). Thus, the reference detection result may be based on using a different type of detection (e.g., segmentation) on the reduced-resolution data (at block 220) from the same sensor 130 or on using a different sensor 130. When the reference detection result is obtained using a different sensor 130, the fields of view of the first sensor and the different sensor 130 must at least overlap in order to facilitate identification of an attention region.

At block 240, obtaining a detection result refers to using the reduced-resolution data (at block 220) to perform object detection. This refers to implementing the typical object detection algorithm associated with the sensor 130. In the exemplary case of the sensor 130 being the camera 110, the result of the object detection (at block 240) may be a set of bounding boxes $B=\{b_j\}$, $j=1, \ldots, n$, where n is the total number of bounding boxes. Each bounding box $b_j$ is a shape (e.g., rectangle) that bounds a region of the low-resolution image and indicates an object class for the region. In embodiments with a different sensor 130, obtaining the detection (at block 240) will be based on the typical detection modality for the sensor 130. For example, processing including beamforming may be used as part of the detection process for data obtained with a radar system 133.

At block 250, determining a difference between the reference detection result (at block 230) and the detection result (at block 240) may result in identifying at least one attention area. The steps involved in identifying an attention area are detailed with reference to FIG. 3. Essentially, areas of the reference detection result (at block 230) that are identified as including an object 140 and that do not coincide with areas of the detection result (at block 240) that are identified as including the object 140 are identified as attention areas. That is, areas where objects may have been missed by the object detection at block 240 are identified based on the reference detection at block 230. At block 260, obtaining a detection result for the attention area using the original data from the sensor refers to using the resolution of the data obtained at block 210. Identifying the attention area, according to one or more embodiments, facilitates improving the initial detection (at block 240) based on the reference detection result (at block 230). According to the embodiments, the initial detection (at block 240) is performed using reduced-resolution data, and resources are only expended to process higher resolution data (obtained at block 210) in an area with a potential target (i.e., attention area).

Figure 3:
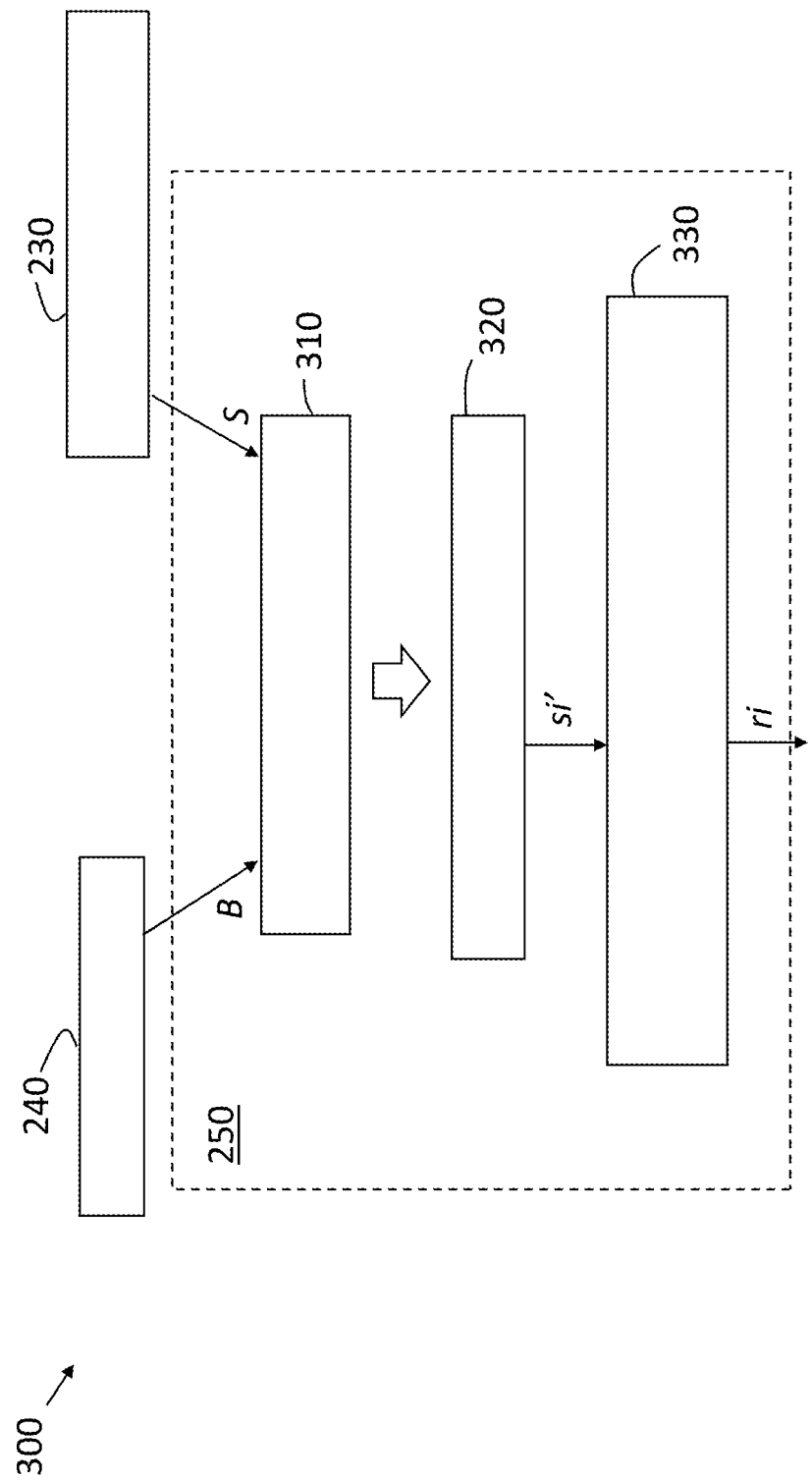
FIG. 3 is a process flow of an exemplary method of identifying an attention area for enhancement of sensor-based detection according to one or more embodiments.

FIG. 3 is a process flow 300 of an exemplary method of identifying an attention area for enhancement of sensor-based detection (block 250, FIG. 2) according to one or more embodiments. The exemplary processes shown in FIG. 3 relate to the sensor 130 being a camera 110, the reference detection result (at block 230) being a segmentation result of pixel regions S={$s_i$}, i=1, . . . , m and m is the total number of pixel regions, and the detection result (at block 240) being a set of bounding boxes B={$b_j$}, j=1, . . . , n, where n is the total number of bounding boxes. The processing at block 250 to identify one or more attention areas begins with finding an intersection of union ($IOU_{ij}$) of between pixel regions S and bounding boxes B, at block 310. Specifically, all pixel regions S that are common with bounding boxes B are removed to determine what pixel regions S are still remaining (i.e., have no corresponding bounding boxes B). The result of removing overlaps between S and B may be some pixels in a pixel region $s_i$ or some whole pixel regions $s_i$ in the set of pixel regions S.

The processes at block 320 and 330 are performed for each remaining $s_i$ in S after block 310. The processes at blocks 320 and 330 may only be performed for remaining $s_i$ that have more than a threshold number of pixels. At block 320, mapping to the original resolution data refers to mapping the pixel region $s_i$ to $s_i'$ in the original image (at block 210, FIG. 2) in the exemplary case. At block 330, the processes include identifying and optionally sizing an input data region as the attention region $r_i$. In the exemplary case, identifying the input data region (i.e., attention region $r_i$), which is the input to the object detection algorithm associated with the sensor 130, refers to identifying a rectangle that encloses $s_i'$ and corresponds with a size of input data for the object detection algorithm used at block 240. For example, if the required input size of the object detection algorithm is 320×240 pixels but the pixel region of $s_i'$ is bigger than 320×240 pixels, then $r_i$ may be set to be the same as $s_i'$. The size of $r_i$ may then be reduced to 320×240 pixels using known methods to match the required input size of the object detection algorithm. Alternately, if the pixel region of $s_i'$ is smaller than the required input size of the object detection algorithm (e.g. 320×240 pixels), then nearby pixels of $s_i'$ may be included so that the size of the attention region $r_i$ is the requisite size needed by the object detection algorithm. With or without the optional resizing, the attention region $r_i$ corresponding with each $s_i'$ is output for further processing using the object detection algorithm of the sensor 130 (e.g., the camera 110 in the example).

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method of identifying an attention region in sensor-based detection, the method comprising:
    obtaining, by processing circuitry, a detection result that indicates one or more detection areas where one or more objects of interest are detected by a sensor, wherein the detection result is based on using a first detection algorithm;
    obtaining, by the processing circuitry, a reference detection result that indicates one or more reference detection areas where one or more objects of interest are detected by the sensor or by a different sensor, wherein the reference detection result is based on using a second detection algorithm;
    identifying, by the processing circuitry, the attention region as one of the one or more reference detection areas without a corresponding one or more detection areas; and
    the processing circuitry using the first detection algorithm to perform detection in the attention region.

2. The method according to claim 1, further comprising obtaining data from a first sensor at a first resolution.

3. The method according to claim 2, further comprising reducing a resolution of the data to a second resolution.

4. The method according to claim 3, wherein the obtaining the detection result includes using the first detection algorithm on the data at the second resolution.

5. The method according to claim 3, wherein the obtaining the reference detection result includes using the second detection algorithm on the data at the second resolution.

6. The method according to claim 2, wherein the obtaining the reference detection result includes using the second detection algorithm on other data from another sensor.

7. The method according to claim 6, wherein the obtaining the detection result and the obtaining the reference detection result includes the first sensor and the another sensor having a common field of view.

8. The method according to claim 2, wherein the obtaining the data from the first sensor includes obtaining the data from a camera.

9. The method according to claim 8, wherein the obtaining the detection result includes obtaining one or more bounding boxes that surround a detected object.

10. The method according to claim 8, wherein the obtaining the reference detection result includes obtaining one or more classification areas resulting from segmentation, each classification area indicating an object classification in an area of a field of view of the camera.

11. A system to identify an attention region in sensor-based detection, the system comprising:
    a sensor configured to obtain data; and
    a processor configured to obtain a detection result that indicates one or more detection areas where one or more objects of interest are detected from the data, wherein the detection result is based on using a first detection algorithm, to obtain a reference detection result that indicates one or more reference detection areas where one or more objects of interest are detected, wherein the reference detection result is based on using a second detection algorithm, to identify the attention region as one of the one or more reference detection areas without a corresponding one or more detection areas, and to use the first detection algorithm to perform detection in the attention region.

12. The system according to claim 11, wherein the data from the sensor is at a first resolution.

13. The system according to claim 12, wherein the processor is further configured to reduce a resolution of the data to a second resolution.

14. The system according to claim 13, wherein the processor obtains the detection result using the first detection algorithm on the data at the second resolution.

15. The system according to claim 13, wherein the processor obtains the reference detection result using the second detection algorithm on the data at the second resolution.

16. The system according to claim 12, wherein the processor obtains the reference detection result using the second detection algorithm on other data from another sensor.

17. The system according to claim 16, wherein the sensor and the other sensor have a common field of view.

18. The system according to claim 16, wherein the sensor and the other sensor are in a vehicle.

19. The system according to claim 12, wherein the first sensor is a camera.

20. The system according to claim 19, wherein the detection result includes one or more bounding boxes that surround a detected object, and the reference detection result includes one or more classification areas resulting from segmentation, each classification area indicating an object classification in an area of a field of view of the camera.

* * * * *